(12) United States Patent
Hashimoto (10) Patent No.: US 11,780,270 B2
(45) Date of Patent: Oct. 10, 2023

(54) TIRE

(71) Applicant: Sumitomo Rubber Industries, Ltd., Kobe (JP)

(72) Inventor: Yuto Hashimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/739,265

(22) Filed: May 9, 2022

(65) Prior Publication Data

US 2022/0396096 A1  Dec. 15, 2022

(30) Foreign Application Priority Data

Jun. 14, 2021  (JP) .................................. 2021-098753

(51) Int. Cl.
*B60C 11/03* (2006.01)
*B60C 11/12* (2006.01)

(52) U.S. Cl.
CPC ...... *B60C 11/0302* (2013.01); *B60C 11/0304* (2013.01); *B60C 11/0306* (2013.01); *B60C 11/1204* (2013.01); *B60C 11/1236* (2013.01); *B60C 2011/0372* (2013.01); *B60C 2011/1213* (2013.01); *B60C 2011/1254* (2013.01)

(58) Field of Classification Search
CPC ............. B60C 11/11; B60C 2011/0372; B60C 11/0302; B60C 11/0306; B60C 11/0304
See application file for complete search history.

(56) References Cited

U.S. PATENT DOCUMENTS

| | | | | | |
|---|---|---|---|---|---|
| 5,213,641 | A | * | 5/1993 | Tsuda | B60C 11/11 152/209.9 |
| 5,301,727 | A | * | 4/1994 | Inoue | B60C 11/11 152/902 |
| 2016/0368326 | A1 | * | 12/2016 | Wakizono | B60C 11/0302 |
| 2018/0236819 | A1 | | 8/2018 | Nakajima | |

FOREIGN PATENT DOCUMENTS

JP  2018-134960 A  8/2018

* cited by examiner

*Primary Examiner* — Cedrick S Williams
(74) *Attorney, Agent, or Firm* — Birch, Stewart, Kolsch & Birch, LLP (57) ABSTRACT

A tire, for which a mounting direction on a vehicle is specified, has a tread portion comprising an outboard shoulder land region provided with outboard shoulder lateral grooves, and an inboard shoulder land region provided with inboard shoulder lateral grooves. The outboard shoulder lateral grooves are bent convexly toward one side in the tire circumferential direction, whereas the inboard shoulder lateral grooves are bent convexly toward the other side in the tire circumferential direction. The bent angle of the outboard shoulder lateral groove is larger than the bent angle of the inboard shoulder lateral groove.

20 Claims, 6 Drawing Sheets

TIRE

BACKGROUND OF THE INVENTION

Field of the Invention

The present disclosure relates to a tire, more particularly to an asymmetric tread pattern.

Background Art

The following Patent Document 1 discloses a tire in which, in order to improve on-snow performance, shoulder land regions of the tread portion are provided with lateral grooves.

Patent Document 1: Japanese Patent Application Publication No. 2018-134960A

SUMMARY OF THE INVENTION

Problems to be Solved by the Invention

In recent years, with the improvement in quietness of automobiles, the tires are required to have improved noise performance.

In view of the above circumstances, the present disclosure was made, and a primary objective of the present disclosure is to provide a tire capable of exhibiting excellent noise performance.

Means for Solving the Problems

According to the present disclosure, a tire has a mounting direction on a vehicle specified for the tire, so that a tread portion of the tire has an outboard tread edge to be positioned away from a center of a vehicle body when the tire is mounted on the vehicle, and an inboard tread edge to be positioned close to the center of the vehicle body, and
the tread portion is provided, between the outboard tread edge and the inboard tread edge, with
a plurality of circumferential grooves extending continuously in the tire circumferential direction, and
a plurality of land regions divided by the plurality of circumferential grooves,
wherein
the plurality of circumferential grooves includes
an outboard shoulder circumferential groove positioned on the most outboard tread edge side, and
an inboard shoulder circumferential groove positioned on the most inboard tread edge side,
the plurality of land regions includes
an outboard shoulder land region positioned axially outside the outboard shoulder circumferential groove and including the outboard tread edge, and
an inboard shoulder land region positioned axially outside the inboard shoulder circumferential groove and including the inboard tread edge,
the outboard shoulder land region is provided with
a plurality of outboard shoulder lateral grooves extending from the outboard shoulder circumferential groove to the outboard tread edge,
the inboard shoulder land region is provided with
a plurality of inboard shoulder lateral grooves extending from the inboard shoulder circumferential groove to the inboard tread edge,
each of the outboard shoulder lateral grooves comprises
an axially inner groove portion and an axially outer groove portion which are inclined with respect to the tire axial direction to opposite directions to each other and bent convexly toward one side in the tire circumferential direction,
each of the inboard shoulder lateral grooves comprises
an axially inner groove portion and an axially outer groove portion which are inclined with respect to the tire axial direction to opposite directions to each other and bent convexly toward the other side in the tire circumferential direction, and
a first bent angle between the axially inner groove portion and the axially outer groove portion of each of the outboard shoulder lateral grooves is larger than a second bent angle between the axially inner groove portion and the axially outer groove portion of each of the inboard shoulder lateral grooves.

DETAILED DESCRIPTION OF THE INVENTION

Embodiments of the present disclosure will now be described in detail in conjunction with accompanying drawings.

Figure 1:
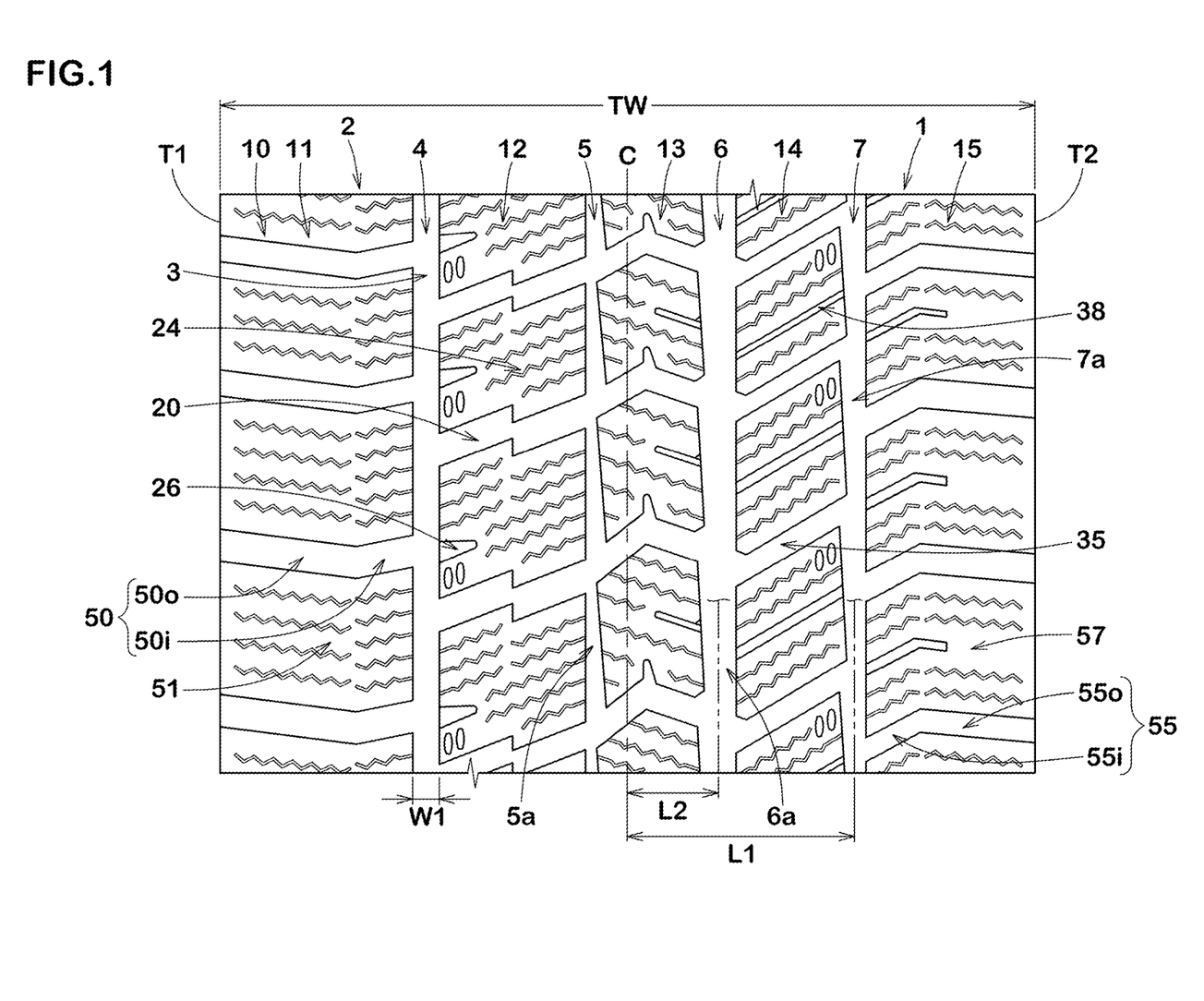
FIG. 1 is a developed partial view of a tread portion of a tire as an embodiment of the present disclosure.

FIG. 1 shows a tread portion 2 of a pneumatic tire 1 for passenger cars as an embodiment of the present disclosure. The pneumatic tire 1 is designed for use in the winter season. But, the tire according to the present disclosure is not limited to such usage.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing cord layer disposed radially outside the carcass in the tread portion.

In the pneumatic tire 1 according to the present disclosure, the mounting direction of the tire on a vehicle is specified. Specifically, it is specified which sidewall portion is positioned outside.

For example, the sidewall portion to be located on outside when attached to the vehicle is provided with an indication such as "outside", and the tire sidewall portion to be located on inside is provided with an indication such as "inside". Thus, the tread portion 2 of the tire 1 has an outboard tread edge T1 to be positioned away from the center of the vehicle body and an inboard tread edge T2 to be positioned close to the center of the vehicle body.

According thereto, in this application, the terms "outboard" and "inboard" are used toward the outboard tread edge T1 and inboard tread edge T2, respectively, to refer relative positions in the tire axial direction.
The terms "axially inner", "axially inward" and the like are used toward the tire equator C, and
the terms "axially outer", "axially outward" and the like are used toward the adjacent tread edge in order to refer relative positions in the tire axial direction.

Further, the tread portion 2 of the pneumatic tire 1 is provided with a tread pattern which is asymmetric with respect to the tire equator C.

Here, the outboard and inboard tread edges T1 and T2 are the axial outermost edges of the ground contacting patch of the tire which occurs when the tire in its normal state contacts with a flat horizontal plane at a camber angle of 0 degrees and 70% of a normal tire load is applied to the tire.

The "normal state" is a state in which, in the case of a pneumatic tire for which various standards are established, the tire is mounted on a normal rim, and inflated to a normal internal pressure, and loaded with no tire load. In the case of a tire for which various standards are not established or a non-pneumatic tire, the normal state means a standard usage state according to the purpose of use of the tire and loaded with no tire load.
In this application, unless other noted, dimensions and the like of each part of the tire refer to values measured under the normal state.

The "normal rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "normal load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of a tire for which various standards are not established, the "normal load" refers to the maximum load applicable to the tire in order to use the tire.

Between the outboard tread edge T1 and the inboard tread edge T2, the tread portion 2 is provided with a plurality of circumferential grooves 3 continuously extending in the tire circumferential direction, and thereby, the tread portion 2 is axially divided into a plurality of land regions 10.

In the present embodiment, the plurality of land regions 10 is made up of five land regions 10 divided by the plurality of circumferential grooves 3 which is made up of four circumferential grooves 3.
However, the present disclosure is not limited to such tread design, and may be applied to, for example, a combination of three circumferential grooves 3 and four land regions 10.

The circumferential grooves 3 include an outboard shoulder circumferential groove 4 and an inboard shoulder circumferential groove 7. The outboard shoulder circumferential groove 4 is positioned on the most outboard tread edge T1 side in the plurality of circumferential grooves 3. The inboard shoulder circumferential groove 7 is positioned on the most inboard tread edge T2 side in the plurality of circumferential grooves 3.

In the present embodiment, the circumferential grooves 3 further include an outboard crown circumferential groove 5 and an inboard crown circumferential groove 6.
The outboard crown circumferential groove 5 is positioned between the outboard shoulder circumferential groove 4 and the tire equator C.
The inboard crown circumferential groove 6 is positioned between the inboard shoulder circumferential groove 7 and the tire equator C.

Each of the circumferential grooves 3 may have various configurations, for example, may be formed as a straight groove, a zigzag groove, a wavy groove, a groove whose both side edges have different configurations or the like.
Specific configurations in the present embodiment will be described later.

The axial distance L1 from the widthwise center line of the outboard shoulder circumferential groove 4 to the tire equator C, and
the axial distance L1 from the widthwise center line of the inboard shoulder circumferential groove 7 to the tire equator C
are, for example, set in a range from 20% to 35% of the tread width TW.

The axial distance L2 from the widthwise center line of the outboard crown circumferential groove 5 to the tire equator C, and the axial distance L2 from the widthwise center line of the inboard crown circumferential groove 6 to the tire equator C
are, for example, set in a range from 3% to 15% of the tread width TW.

Here, the tread width TW is the distance measured in the tire axial direction between the outboard tread edge T1 and the inboard tread edge T2 under the above-mentioned normal state.

Preferably, the groove widths W1 of the circumferential grooves 3 are at least 3 mm.
Preferably, the groove widths W1 of the circumferential grooves 3 are in a range from 2.0% to 6.0% of the tread width TW.
In the present embodiment, the inboard crown circumferential groove 6 has the largest groove width among the circumferential grooves 3.

The plurality of land regions 10 includes an outboard shoulder land region 11 and an inboard shoulder land region 15.
The outboard shoulder land region 11 is positioned axially outside the outboard shoulder circumferential groove 4 and includes the outboard tread edge T1.
The inboard shoulder land region 15 is positioned axially outside the inboard shoulder circumferential groove 7 and includes the inboard tread edge T2.

In the present embodiment, the plurality of the land regions 10 further include an outboard middle land region 12, an inboard middle land region 14, and a crown land region 13.
The outboard middle land region 12 is defined between the outboard shoulder circumferential groove 4 and the outboard crown circumferential groove 5, and is adjacent to the outboard shoulder land region 11 via the outboard shoulder circumferential groove 4.
The inboard middle land region 14 is defined between the inboard shoulder circumferential groove 7 and the inboard crown circumferential groove 6 and is adjacent to the inboard shoulder land region 15 via the inboard shoulder circumferential groove 7.

The crown land region 13 is defined between the outboard crown circumferential groove 5 and the inboard crown circumferential groove 6.

Figure 2:
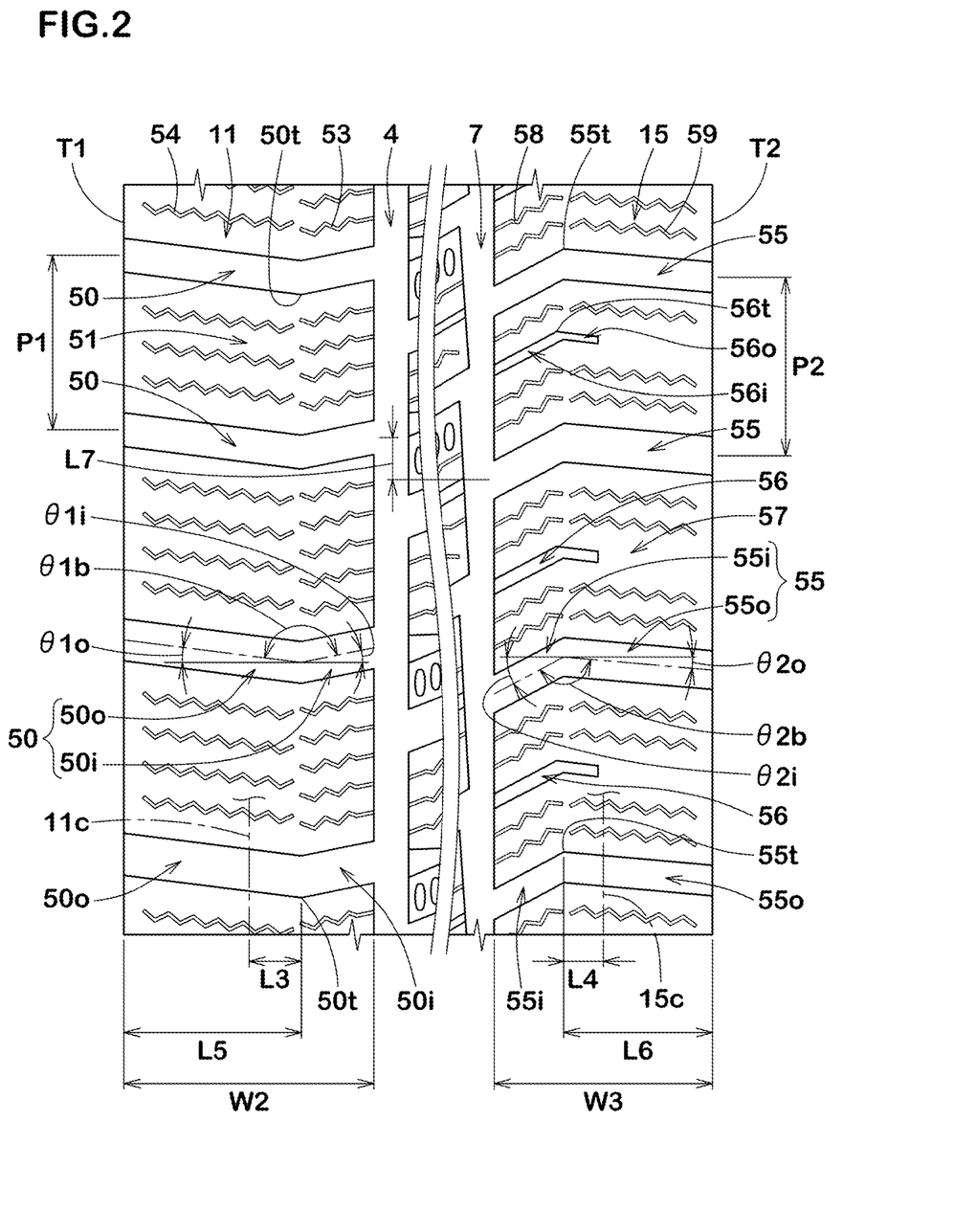
FIG. 2 is a partial view of the tread portion showing the outboard shoulder land region and the inboard shoulder land region.

FIG. 2 shows the outboard shoulder land region 11 and the inboard shoulder land region 15, omitting the land regions 12, 13 and 14.

As shown, the outboard shoulder land region 11 is provided with a plurality of outboard shoulder lateral grooves 50.

The outboard shoulder lateral grooves 50 extend axially outwardly from the outboard shoulder circumferential groove 4 to the outboard tread edge.

The inboard shoulder land region 15 is provided with a plurality of inboard shoulder lateral grooves 55.

The inboard shoulder lateral grooves 55 extend axially outwardly from the inboard shoulder circumferential groove 7 to the inboard tread edge T2.

The outboard shoulder lateral grooves 50 and the inboard shoulder lateral grooves 55 may be extended beyond the outboard tread edge T1 and the inboard tread edge T2 into regions (not shown) axially outside the respective tread edges T1 and T2.

Each of the outboard shoulder lateral grooves 50 comprises an axially inner groove portion 50i and an axially outer groove portion 50o which are positioned between the outboard shoulder circumferential groove 4 and the outboard tread edge T1.

The axially inner groove portion 50i is inclined with respect to the tire axial direction to a first direction (or to one side in the tire circumferential direction) while extending axially outward (such inclination is upward to the right in each drawing of the present specification).

The axially outer groove portion 50o is inclined with respect to the tire axial direction to a second direction opposite to the first direction (namely, to the other side in the tire circumferential direction) while extending axially outward (such inclination is downward to the right in each drawing of the present specification).

As a result, each of the outboard shoulder lateral grooves 50 is bent convexly toward the one side in the tire circumferential direction.

Each of the inboard shoulder lateral grooves 55 comprises an axially inner groove portion 55i and the axially outer groove portion 55o which are positioned between the inboard shoulder circumferential groove 7 and the inboard tread edge T2.

The axially inner groove portion 55i is inclined with respect to the tire axial direction to the above-said second direction (namely, to the other side in the tire circumferential direction) while extending axially outward.

The axially outer groove portion 55o is included with respect to the tire axial direction to the above-said first direction (namely, to the one side in the tire circumferential direction) while extending axially outward.

As a result, each of the inboard shoulder lateral grooves 55 is bent convexly toward the other side in the tire circumferential direction.

In this application, the expression "a lateral groove is bent convexly toward the tire circumferential direction" means that the lateral groove is locally bent so that a portion of the widthwise center line of the lateral groove is bent or curved, and the length of such bent or curved portion is not more than 10% of the total length thereof. In the case of the outboard shoulder lateral grooves 50 and the inboard shoulder lateral grooves 55 of the present embodiment, it is preferable that the length of the bent or curved portion of the widthwise center line is not more than 5% of the total length. When the bent or curved portion is a curved portion, it is preferable that the radius of curvature thereof is not more than 1.0 mm.

In the present disclosure, the bent angle θ1b between the axially inner groove portion 50i and the axially outer groove portion 50o of the outboard shoulder lateral groove 50 is larger than
the bent angle θ2b between the axially inner groove portion 55i and the axially outer groove portion 55o of the inboard shoulder lateral groove 55. By adopting such configurations, the tire 1 of the present disclosure can exhibit excellent noise performance.

Since the outboard shoulder lateral grooves 50 and the inboard shoulder lateral grooves 55 are bent, the generation of a standing wave in the groove can be suppressed, and the generation of the air column resonance sound caused by these lateral grooves can be suppressed.

Further, since the outboard shoulder lateral grooves 50 and the inboard shoulder lateral grooves 55 are bent convexly toward the opposite directions, the above-mentioned effects can be expected regardless of the rolling direction of the tire.

Further, since the bent angle θ1b of the outboard shoulder lateral grooves 50 is larger than the bent angle θ2b of the inboard shoulder lateral grooves 55, the frequency bands of various noises generated by these lateral grooves can be dispersed, and noise performance is improved.

Further, since the bent angle θ1b of the outboard shoulder lateral grooves 50 is relatively large, it is possible to suppress the decrease in rigidity in the tire axial direction of the outboard shoulder land region 11 due to the outboard shoulder lateral grooves 50, and on-snow cornering performance is maintained.

Hereinafter, the present embodiment will be described in more detail. Each configuration described below shows a specific example in the present embodiment. Therefore, the present disclosure can exert the above-explained effects even if it does not have the configuration described below. Further, even if any one of the configurations described below is independently applied to the tire of the present disclosure having the above-mentioned characteristics, improvement in performance according to the applied configuration can be expected. In addition, when some of the configurations described below are applied in combination, the combined performance improvement by the respective configurations can be expected.

In the embodiment shown in FIG. 1, the circumferential grooves 3 are as follows.

The outboard shoulder circumferential groove 4 is a straight groove which extends straight in the tire circumferential direction while keeping a constant groove width.

The inboard shoulder circumferential groove 7 extends substantially straight in the tire circumferential direction while repeatedly changing the groove width so as to have a plurality of variable width portions 7a arranged in the tire circumferential direction, and in the variable width portions 7a, the groove width gradually decreases toward the above-said one side in the tire circumferential direction.

The inboard crown circumferential groove 6 extends substantially straight in the tire circumferential direction while repeatedly changing the groove width so as to have a plurality of variable width portions 6a arranged in the tire circumferential direction, and in the variable width portions 6a, the groove width gradually decreases toward the above-said one side in the tire circumferential direction.

The outboard crown circumferential groove 5 extends substantially straight in the tire circumferential direction while repeatedly changing the groove width so as to have a plurality of variable width portions 5a arranged in the tire circumferential direction, and in the variable width portions 5a, the groove width gradually decreases toward the above-said other side in the tire circumferential direction.

In the circumferential groove 3 having such variable width portions, the snow therein can be strongly compacted towards the direction to which the groove width decreases, which helps to improve on-snow performance such as cornering performance.

Further, by providing the variable width portions 5a, 6a and 7a as explained above, large shearing force from the compacted snow blocks can be obtained in both circumferential directions, namely, during acceleration and deceleration.

In the present embodiment, it is preferable that, as shown in FIG. 2, the axial width W3 of the ground contact surface of the inboard shoulder land region 15 is smaller than the axial width W2 of the ground contact surface of the outboard shoulder land region 11.

Specifically, the axial width W3 is preferably not less than 75%, more preferably not less than 80%, but preferably not more than 95%, more preferably not more than 90% of the axial width W2.

This makes it easier for the inboard shoulder land region 15 to deform properly, and provides excellent on-snow performance.

The bent angle θ1b of the outboard shoulder lateral grooves 50 is not less than 135 degrees, preferably not less than 150 degrees, but not more than 170 degrees,
the bent angle θ2b of the inboard shoulder lateral grooves 55 is not less than 135 degrees, preferably not less than 140 degrees, but not more than 170 degrees, preferably not more than 160 degrees, and
the bent angle θ1b is preferably not less than 101%, more preferably not less than 105%, but preferably not more than 120%, more preferably not more than 115% of the bent angle θ2b.

Such angle setting improves noise performance and on-snow cornering performance in a well-balanced manner.

In the present embodiment, the difference θ1b-θ2b between the bent angle θ1b and the bent angle θ2b is preferably not less than 3 degrees, more preferably not less than 8 degrees, but preferably not more than 28 degrees, more preferably not more than 18 degrees.

As a result, it is possible to exhibit sufficient on-snow cornering performance while improving noise performance.

In the present embodiment, the angle θ2i of the axially inner groove portion 55i of the inboard shoulder lateral groove 55 with respect to the tire axial direction is larger than the angle θ1i of the axially inner groove portion 50i of the outboard shoulder lateral groove 50 with respect to the tire axial direction, and
the angle θ2o of the axially outer groove portion 55o of the inboard shoulder lateral groove 55 with respect to the tire axial direction is smaller than the angle θ1o of the axially outer groove portion 50o of the outboard shoulder lateral groove 50 with respect to the tire axial direction.

Such angle setting provides excellent on-snow cornering performance over a wide range of slip angles.

The angle θ1i of the axially inner groove portion 50i of the outboard shoulder lateral groove 50 is, for example, set in a range from 5 to 15 degrees. The angle θ2i of the axially inner groove portion 55i of the inboard shoulder lateral groove 55 is, for example, set in a range from 20 to 35 degrees. The difference between the angle θ1i and the angle θ2i is, for example, 5 to 20 degrees. By making the difference between the angle θ1i and the angle θ2i relatively large in this way, it is possible to increase the difference between the moving speed of the air flowing from the outboard shoulder circumferential groove 4 into the outboard shoulder lateral groove 50, and the moving speed of the air flowing from the inboard shoulder circumferential groove 7 into the inboard shoulder lateral groove 55, and
the noise generated from the lateral grooves can be effectively converted into white noise.

The angle θ1o of the axially outer groove portion 50o of the outboard shoulder lateral groove 50 is, for example, set in a range from 5 to 10 degrees. The angle θ2o of the axially outer groove portion 55o of the inboard shoulder lateral groove 55 is, for example, set in a range from 3 to 7 degrees. The difference between the angle θ1o and the angle θ2o is, for example, not more than 10 degrees. As a result, the difference between the rigidity of the land region in the vicinity of the outboard tread edge T1 and the rigidity of the land region in the vicinity of the inboard tread edge T2 can be reduced. Therefore, the steering response becomes linear, and excellent on-snow cornering performance can be obtained.

Preferably, the difference between the angle θ1o and the angle θ2o is smaller than the difference between the angle θ1i and the angle θ2i. As a result, the above-mentioned improvement in noise performance and the above-mentioned improvement in on-snow cornering performance can be obtained in a well-balanced manner.

The outboard shoulder lateral groove 50 has a bent point 50t between the axially inner groove portion 50i and the axially outer groove portion 50o. The bent point 50t of the outboard shoulder lateral groove 50 is located axially inside the center position 11c in the tire axial direction, of the ground contact surface of the outboard shoulder land region 11.

The axial distance L3 from the center position 11c to the bent point 50t is, for example, in a range from 15% to 25% of the axial width W2 of the ground contact surface of the outboard shoulder land region 11.

Such outboard shoulder lateral groove 50 can exhibit excellent noise performance while suppressing uneven wear of the outboard shoulder land region 11.

From the same viewpoint, the inboard shoulder lateral groove 55 has a bent point 55t between the axially inner groove portion 55i and the axially outer groove portion 55o. The bent point 55t of the inboard shoulder lateral groove 55 is located axially inside the center position 15c in the tire axial direction, of the ground contact surface of the inboard shoulder land region 15.

The axial distance L4 from the center position 15c to the bent point 55t is, for example, in a range from 15% to 25% of the axial width W3 of the ground contact surface of the inboard shoulder land region 15.

Preferably, the axial distance L4 is smaller than the axial distance L3. This makes it easier for the noise generated by the lateral grooves to be converted into white noise.

The axial length L5 of the axially outer groove portion 50o of the outboard shoulder lateral groove 50 is preferably not less than 60%, more preferably not less than 65%, but preferably not more than 80%, more preferably not more than 75% of the axial width W2 of the ground contact surface of the outboard shoulder land region 11.

The axial length L6 of the axially outer groove portion 55o of the inboard shoulder lateral groove 55 is preferably not less than 60%, more preferably not less than 65%, but preferably not more than 75%, more preferably not more than 70% of the axial width W3 of the ground contact surface of the inboard shoulder land region 15.

It is preferable that the axial length L5 of the axially outer groove portion 50o of the outboard shoulder lateral groove 50 is larger than the axial length L6 of the axially outer groove portion 55o of the inboard shoulder lateral groove 55.

Specifically, the axial length L5 of the axially outer groove portion 50o of the outboard shoulder lateral groove 50 is set in a range from 105% to 130% of the axial length L6 of the axially outer groove portion 55o of the inboard shoulder lateral groove 55.

Thereby, the rigidity of the outboard shoulder land region 11 is secured in the vicinity of the outboard tread edge T1, and excellent on-snow cornering performance can be obtained.

It is preferable that the positions in the tire circumferential direction of the axially inner ends of the inboard shoulder lateral grooves 55 are respectively shifted in the tire circumferential direction from the positions in the tire circumferential direction of the axially inner ends of the outboard shoulder lateral grooves 50.

Specifically, this means that the axially inner ends of the widthwise center lines of the inboard shoulder lateral grooves 55 are respectively shifted in the tire circumferential direction from the axially inner ends of the widthwise center lines of the outboard shoulder lateral grooves 50.

Preferably, the distance L7 in the tire circumferential direction between the axially inner ends of the corresponding inboard shoulder lateral groove 55 and outboard shoulder lateral groove 50 is not less than 3 to 15 mm, more preferably not less than 5 mm, but not more than 3 to 15 mm, more preferably not more than 10 mm.

Owing to such arrangement, the air flow from the circumferential grooves into the respective lateral grooves 50 and 55 can be shifted in time or dispersed. This helps to improve noise performance.

In the present embodiment, the pitch lengths P1 in the tire circumferential direction of the outboard shoulder lateral grooves 50 are in a range from 65% to 75% of the axial width W2 of the ground contact surface of the outboard shoulder land region 11, and
the pitch lengths P2 in the tire circumferential direction of the inboard shoulder lateral grooves 55 are in a range from 75% to 90% of the axial width W3 of the ground contact surface of the inboard shoulder land region 15. The present disclosure is however, not limited to such pitch arrangement.

Preferably, the maximum groove width of the outboard shoulder lateral grooves 50 and the maximum groove width of the inboard shoulder lateral grooves 55 are not less than 3.0 mm, more preferably not less than 4.0 mm, but not more than to 8.0 mm, more preferably not more than 7.0 mm. Preferably, the maximum groove width of the outboard shoulder lateral grooves 50 is larger than the maximum groove width of the inboard shoulder lateral grooves 55.

As a result, the outboard shoulder lateral grooves 50 can provide large shearing force from the compacted snow blocks in the grooves, and on-snow cornering performance can be improved.

Preferably, the maximum depth of the outboard shoulder lateral grooves 50 and the maximum depth of the inboard shoulder lateral grooves 55 are not less than 8.0 mm, but not more than 10.0 mm, more preferably not more than 9.0 mm. Such outboard shoulder lateral grooves 50 and inboard shoulder lateral grooves 55 improve noise performance and on-snow cornering performance in a well-balanced manner.

The outboard shoulder land region 11 comprises a plurality of outboard shoulder blocks 51 divided by a plurality of outboard shoulder lateral grooves 50.

Each of the outboard shoulder blocks 51 is provided with a plurality of sipes but not provided with a groove.

In the present embodiment, each of the outboard shoulder blocks 51 is provided with a plurality of axially inner first outboard shoulder sipes 53 and a plurality of axially outer second outboard shoulder sipes 54.

In this application, the term "sipe" means a narrow groove having a groove width not more than 1.5 mm between its opposite inner walls substantially parallel to each other, inclusive of a cut having no substantial width.

The expression "substantially parallel" means that angles formed between the opposite inner walls are not more than 10 degrees.

Preferably, the width of the sipe is not less than 0.5 mm, more preferably not less than 0.4 mm, but not more than 1.5 mm, more preferably not more than 1.0 mm.

In the present embodiment, each sipe is configured as a so-called 3D sipe which extends zigzag in the length direction thereof when viewed in the tread surface and also zigzag in the depth direction thereof.

The configuration of the sipe is not limited to the above. For example, it may be possible to employ a sipe provided with a wide portion having a width of more than 1.5 mm at the radially inner end of a portion having a width of not more than 1.5 mm. Further, it may be possible to employ a sipe whose at least one of the sipe edges is chamfered.

The first outboard shoulder sipes 53 extend axially outwardly from the outboard shoulder circumferential groove 4 and are terminated within the outboard shoulder blocks 51. In the present embodiment, the first outboard shoulder sipes 53 extend along the axially inner groove portions 50i of the outboard shoulder lateral grooves 50.

Such first outboard shoulder sipes 53 can improve on-snow performance while suppressing uneven wear of the outboard shoulder land region 11.

The second outboard shoulder sipes 54 are disposed axially outside the first outboard shoulder sipes 53. The axially outer ends and the axially inner ends of the second outboard shoulder sipes 54 are terminated within the outboard shoulder blocks 51.

In the present embodiment, the second outboard shoulder sipes 54 extend along the axially outer groove portions 50o of the outboard shoulder lateral grooves 50.

It is preferable that, in each of the outboard shoulder blocks 51, the number of the second outboard shoulder sipes 54 is smaller than the number of the first outboard shoulder sipes 53.

Such sipe arrangement suppresses uneven wear in the vicinity of the outboard tread edge T1, and makes the steering response linear even when turning at a large slip angle.

The inboard shoulder land region 15 is provided with a plurality of semi-closed inboard shoulder grooves 56.

The semi-closed inboard shoulder grooves 56 extends axially outwardly from the inboard shoulder circumferential groove 7, and are terminated without reaching the inboard tread edge T2.

Such semi-closed inboard shoulder grooves 56 help to improve noise performance and on-snow cornering performance in a well-balanced manner.

Each of the semi-closed inboard shoulder grooves 56 comprises an axially inner groove portion 56i and an axially outer groove portion 56o which are positioned between the inboard shoulder circumferential groove 7 and the inboard tread edge T2.

The axially inner groove portion 56*i* is inclined with respect to the tire axial direction to the above-said second direction (to the other side in the tire circumferential direction) while extending axially outward.

The axially outer groove portion 56*o* is inclined with respect to the tire axial direction to the above-said first direction (to the one side in the tire circumferential direction) while extending axially outward.

Therefore, each of the semi-closed inboard shoulder grooves 56 is bent in the same direction as the inboard shoulder lateral grooves 55, namely, convexly toward the other side in the tire circumferential direction.

Such semi-closed inboard shoulder grooves 56 suppress uneven wear of the inboard shoulder land region 15, and can exert the above-mentioned effect.

The above-mentioned limitation to the bent angle θ2*b* of the inboard shoulder lateral grooves 55 can be applied to the bent angle between the axially inner groove portion 56*i* and the axially outer groove portion 56*o* of the semi-closed inboard shoulder groove 56.

Further, the above-mentioned limitation to the angle θ2*i* of the axially inner groove portion 55*i* of the inboard shoulder lateral groove 55 can be applied to the angle with respect to the tire axial direction of the axially inner groove portion 56*i* of the semi-closed inboard shoulder groove 56.

The above-mentioned limitation to the angle θ2*o* of the axially outer groove portion 55*o* of the inboard shoulder lateral groove 55 can be applied to the angle with respect to the tire axial direction of the axially outer groove portion 56*o* of the semi-closed inboard shoulder groove 56.

It is preferable that, in each of the semi-closed inboard shoulder grooves 56, the axial length of the axially outer groove portion 56*o* is smaller than the axial length of the axially inner groove portion 56*i* in order to secure a sufficient distance between the semi-closed inboard shoulder groove 56 and the inboard tread edge T2. As a result, the decrease in rigidity in the vicinity of the inboard tread edge T2 is suppressed, and excellent on-snow cornering performance can be exhibited.

The maximum groove width of the semi-closed inboard shoulder grooves 56 is smaller than the maximum groove width of the inboard shoulder lateral grooves 55. For example, the maximum groove width of the semi-closed inboard shoulder grooves 56 is not more than 3.0 mm, preferably not more than 2.5 mm.

The maximum depth of the semi-closed inboard shoulder grooves 56 is smaller than the maximum depth of the inboard shoulder lateral grooves 55. For example, the maximum depth of the semi-closed inboard shoulder grooves 56 is not less than 3.0 mm, preferably not less than 4.0 mm, but not more than 7.0 mm, preferably not more than 6.0 mm.

The semi-closed inboard shoulder groove 56 has a bent point 56*t* between the axially inner groove portion 56*i* and the axially outer groove portion 56*o*.

The distance measured in the tire axial direction between the bent point 56*t* of the semi-closed inboard shoulder groove 56 and the bent point 55*t* of the inboard shoulder lateral groove 55 is not more than 10 mm.

As a result, the semi-closed inboard shoulder grooves 56 can improve on-snow cornering performance in cooperation with the inboard shoulder lateral grooves 55.

The bent points 56*t* of the semi-closed inboard shoulder grooves 56 may be located axially inside the bent points 55*t* of the inboard shoulder lateral grooves 55. As a result, uneven wear of the inboard shoulder land region 15 may be suppressed.

By the inboard shoulder lateral grooves 55, the inboard shoulder land region 15 is circumferentially divided into a plurality of inboard shoulder blocks 57.

In the present embodiment, each of the inboard shoulder blocks 57 is provided with a plurality of first inboard shoulder sipes 58 and a plurality of second inboard shoulder sipes 59.

The first inboard shoulder sipes 58 extend axially outwardly from the inboard shoulder circumferential groove 7, and are terminated within the inboard shoulder block 57.

The first inboard shoulder sipes 58 extend along the axially inner groove portions 55*i* of the inboard shoulder lateral grooves 55.

Such first inboard shoulder sipes 58 improve steering stability on dry roads and on-snow performance in a well-balanced manner.

The second inboard shoulder sipes 59 are positioned axially outside the first inboard shoulder sipes 58.

The axially inner ends and outer ends of the second inboard shoulder sipes 59 are terminated within the inboard shoulder block 57.

The second inboard shoulder sipes 59 extend along the axially outer groove portions 55*o* of the inboard shoulder lateral grooves 55.

Such second inboard shoulder sipe 59 improves steering stability on a dry road surface and on-snow performance in a well-balanced manner.

Figure 3:
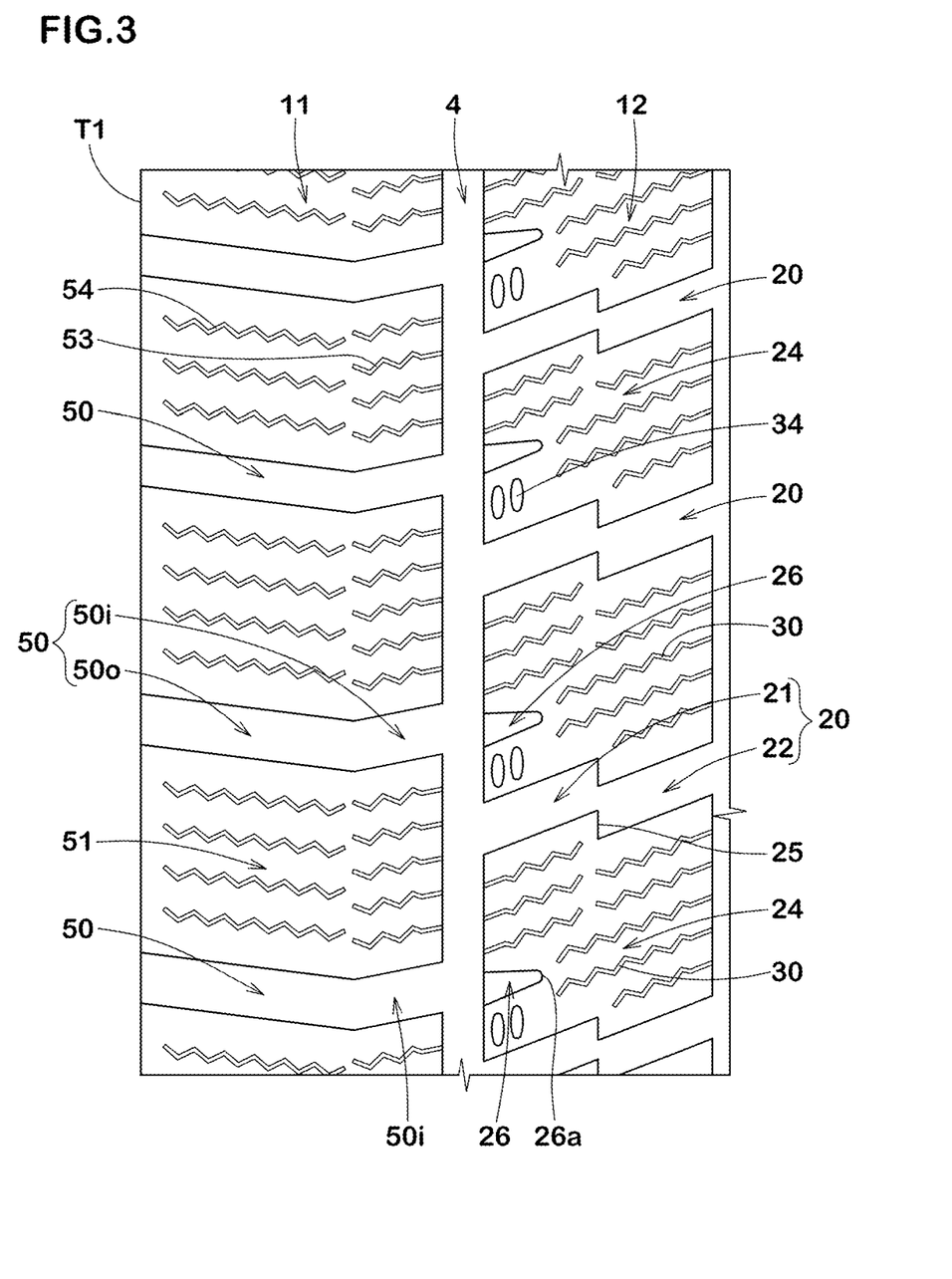
FIG. 3 is a partial view of the tread portion showing the outboard shoulder land region and the outboard middle land region.

FIG. 3 shows the outboard shoulder land region 11 and the outboard middle land region 12.

As shown, the outboard middle land region 12 is provided with a plurality of outboard middle lateral grooves 20 extending across the entire axial width thereof. Thereby, the outboard middle land region 12 is circumferentially divided into outboard middle blocks 24.

The outboard middle lateral groove 20 comprises a first groove portion 21 on the outboard tread edge T1 side, and a second groove portion 22 on the inboard tread edge T2 side.

The first groove portion 21 and the second groove portion 22 extends axially in the same direction, and the second groove portion 22 is shifted toward the one side in the tire circumferential direction from the first groove portion 21.

For example, the amount of shift in the tire circumferential direction is in a range from about 40% to 60% of the groove width in the tire circumferential direction.

As a result, the two groove edges of the outboard middle lateral groove 20 are respectively provided with the circumferentially-extending edge portions 25 between the first groove portion 21 and the second groove portion 22 as shown in FIG. 3.

Since the circumferentially-extending edge portions 25 can provide a large frictional force in the tire axial direction, the outboard middle lateral grooves 20 improve on-snow cornering performance.

The outboard middle lateral grooves 20 are inclined with respect to the tire axial direction to the above-said first direction (to the one side in the tire circumferential direction) while extending axially outward.

The angle of the outboard middle lateral groove 20 in the first groove portion 21 and the second groove portion 22) is preferably not more than 45 degrees, more preferably not more than 25 degrees, but preferably not less than 15 degrees with respect to the tire axial direction.

Such outboard middle lateral grooves 20 help to improve on-snow cornering performance.

The above-said two circumferentially-extending edge portions 25 are preferably disposed within the central part in the tire axial direction of the outboard middle block 24 when axially divided into three equal parts by virtual planes extending parallel to the tire circumferential direction and parallel to the tire radial direction.

The angles of the circumferentially-extending edge portions 25 are not more than 10 degrees, preferably not more than 5 degrees with respect to the tire circumferential direction in the ground contact surface of the outboard middle land region 12. Preferably, the circumferentially-extending edge portions 25 are parallel with the tire circumferential direction, namely, the angles are zero.

Such circumferentially-extending edge portions 25 provide a large reaction force in the tire axial direction when running on snow and improve on-snow cornering performance.

It is preferable that the outboard middle land region 12 is provided with a plurality of semi-closed grooves 26.

The semi-closed grooves 26 extend axially inwardly from the outboard shoulder circumferential groove 4, and are terminated within the outboard middle land region 12. Preferably, the semi-closed grooves 26 are terminated at axial positions on the outboard tread edge T1 side of the circumferentially-extending edge portions 25 of the outboard middle lateral grooves 20.

The axial lengths of the semi-closed grooves 26 are smaller than the axial lengths of the axially inner groove portion 50*i* of the outboard shoulder lateral groove 50.

Such semi-closed grooves 26 can improve on-snow cornering performance without impairing noise performance.

In the present embodiment, the groove width of each of the semi-closed groove 26 gradually decreases from the outboard shoulder circumferential groove 4 toward its terminated axially inner end 26*a*. Further, the semi-closed grooves 26 is inclined with respect to the tire axial direction to the above-said first direction (to the one side in the tire circumferential direction) while extending axially outward. The angle of the widthwise center line of the semi-closed groove 26 with respect to the tire axial direction is not more than 45 degrees, preferably not more than 25 degrees, but preferably not less than 10 degrees.

Preferably, the axially outer open ends of the semi-closed grooves 26 respectively face the axially inner open ends of the outboard shoulder lateral grooves 50.

In this case, the circumferential width (or circumferential extent) of the opening of the axially outer end of the outboard shoulder lateral groove 50 at least partially overlaps, in the tire circumferential direction, with the circumferential width (of circumferential extent) of the opening of the axially inner end of the semi-closed groove 26.

Preferably, 50% or more of the circumferential width of the opening of the outboard shoulder lateral groove 50 overlaps with that of the semi-closed groove 26.

As a result, the semi-closed groove 26 can form a large compacted snow block in cooperation with the outboard shoulder lateral groove 50, and thereby, on-snow cornering performance is further improved.

Each of the outboard middle blocks 24 is provided with a plurality of outboard middle sipes 30.

The outboard middle sipes 30 are inclined with respect to the tire axial direction to the above-said first direction (to the one side in the tire circumferential direction) while extending axially outward.

The angles of the outboard middle sipes 30 are set to be not less than 15 degrees, but not more than 25 degrees with respect to the tire axial direction. If the sipe extends in a wavy or zigzag shape, the angle is measured at the centerline of the amplitude of the sipe.

The outboard middle sipes 30 of each outboard middle block 24 include at least one outboard middle sipe 30 which extends from the circumferential groove 4 or 5 and is terminated within the outboard middle block 24.

Such outboard middle sipe 30 can improve the braking on-snow performance while maintaining the rigidity of the outboard middle block 24.

In the present embodiment, each of the outboard middle sipes 30 extends from the circumferential groove 4 or 5 and is terminated within the outboard middle block 24.

In the present embodiment, the ground contact surface of each of the outboard middle blocks 24 is provided, between the first groove portion 21 and the semi-closed groove 26, with dimples 34.

The dimple 34 has a circumferentially-long elliptical edge. Such dimples 34 moderately relax the rigidity of the outboard middle block 24, and help to prevent the outboard middle lateral grooves 20 and the semi-closed grooves 26 from being clogged with snow.

Figure 4:
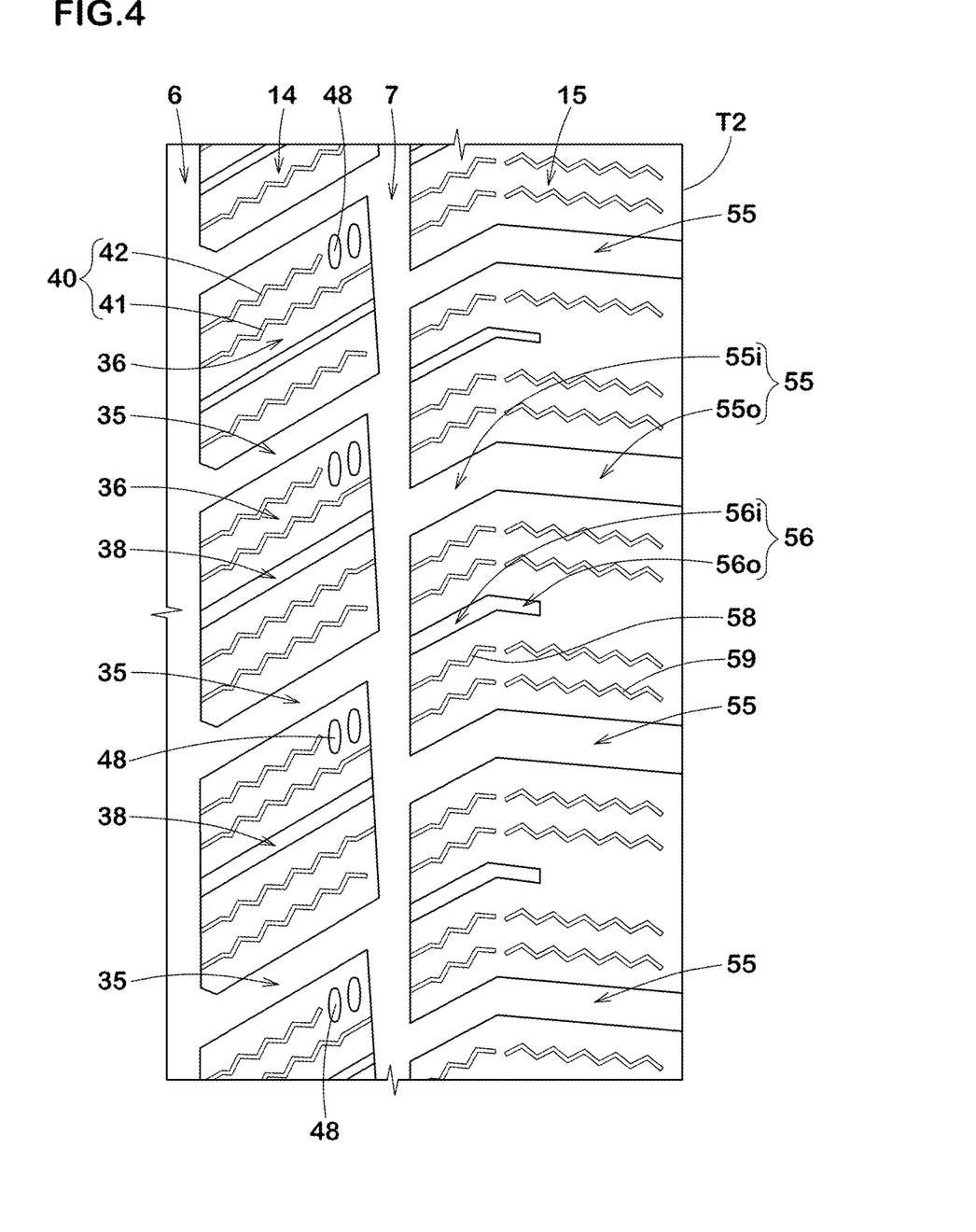
FIG. 4 is a partial view of the tread portion showing the inboard shoulder land region and the inboard middle land region.

FIG. 4 shows the inboard middle land region 14 and the inboard shoulder land region 15.

As shown, the inboard middle land region 14 is provided with a plurality of inboard middle lateral grooves 35.

The inboard middle lateral grooves 35 extend across the entire axial width of the inboard middle land region 14. Thereby, the inboard middle land region 14 is circumferentially divided into a plurality of inboard middle blocks 36. The inboard middle lateral grooves 35 are inclined with respect to the tire axial direction in the above-said second direction (to the other side in the tire circumferential direction) while extending axially outward.

In the present embodiment, the angles of the inboard shoulder lateral grooves 55 are set in a range from 15 to 25 degrees with respect to the tire axial direction.

Preferably, the axially outer ends of the inboard middle lateral grooves 35 respectively face the axially inner ends of the semi-closed inboard shoulder grooves 56.

In this case, the circumferential width (or circumferential extent) of the opening of the axially outer end of the inboard middle lateral groove 35 at least partially overlaps, in the tire circumferential direction, with the circumferential width (or circumferential extent) of the opening of the axially inner end of the semi-closed inboard shoulder groove 56.

Preferably, 50% or more of the circumferential width of the opening of the axially outer end of the inboard middle lateral groove 35 overlaps with that of the semi-closed inboard shoulder groove 56.

Thereby, the inboard middle lateral grooves 35 can form large compacted snow blocks in cooperation with the semi-closed inboard shoulder grooves 56, and as a result, on-snow cornering performance is further improved.

From the viewpoint of further enhancing the above-mentioned effect, it is preferable that an extension of the inboard middle lateral groove 35, which is extended in parallel with the longitudinal direction thereof toward the inboard tread edge T2, overlaps with 50% or more of the opening area of the opening of the axially inner end of the semi-closed inboard shoulder groove 56.

The above-mentioned inboard middle land region 14 is provided with a plurality of narrow lateral grooves 38.

The narrow lateral grooves 38 extend across the entire axial width of the inboard middle land region 14.

The narrow lateral grooves 38 are inclined with respect to the tire axial direction to the above-said second direction (to the other side in the tire circumferential direction) while extending axially outward.

The groove width and depth of the narrow lateral groove 38 are respectively smaller than the groove width and depth of the inboard middle lateral groove 35.

Such narrow lateral grooves 38 can increase edges of the inboard middle land region 14, while maintaining the rigidity of the inboard middle land region 14.

Preferably, the axially outer ends of the narrow lateral grooves 38 respectively face the axially inner ends of the inboard shoulder lateral grooves 55.

In this case, the circumferential width (or circumferential extent) of the opening of the axially outer end of the narrow lateral groove 38 at least partially overlaps, in the tire circumferential direction, with the circumferential width (or circumferential extent) of the opening of the axially inner end of the inboard shoulder lateral groove 55. Preferably, 50% or more of the circumferential width of the opening of the axially outer end of the narrow lateral groove 38 overlaps with that of the inboard shoulder lateral groove 55.

This makes it easier for the narrow lateral groove 38 to open when its edges contact with the ground, and the frictional force provided by the edges increases, therefore, on-snow performance can be improved.

From the viewpoint of further exerting the above-mentioned effects, it is preferred that an extension of the axially inner groove portion 55i of the inboard shoulder lateral groove 55, which is extended in parallel with the longitudinal direction thereof toward the tire equator C, overlaps with 50% or more of the opening area of the opening of the narrow lateral groove 38.

Each of the inboard middle blocks 36 is provided with a plurality of inboard middle sipes 40, which include
a full-open sipe 41 completely crossing the inboard middle block 36 in the tire axial direction, and
a semi-open sipe 42 extending from the inboard crown circumferential groove 6 and terminated within the inboard middle block 36.

Such inboard middle sipes 40 help to improve steering stability on dry roads and on-snow performance in a well-balanced manner.

In the present embodiment, the ground contact surface of each of the inboard middle blocks 36 is provided, between the semi-open sipe 42 and the inboard shoulder circumferential groove 7, with dimples 48.

The dimple 48 has a circumferentially-long elliptical edge. Such dimples 48 can moderately relax the rigidity of the inboard middle blocks 36 and prevent snow from clogging the grooves around the dimples 48.

Figure 5:
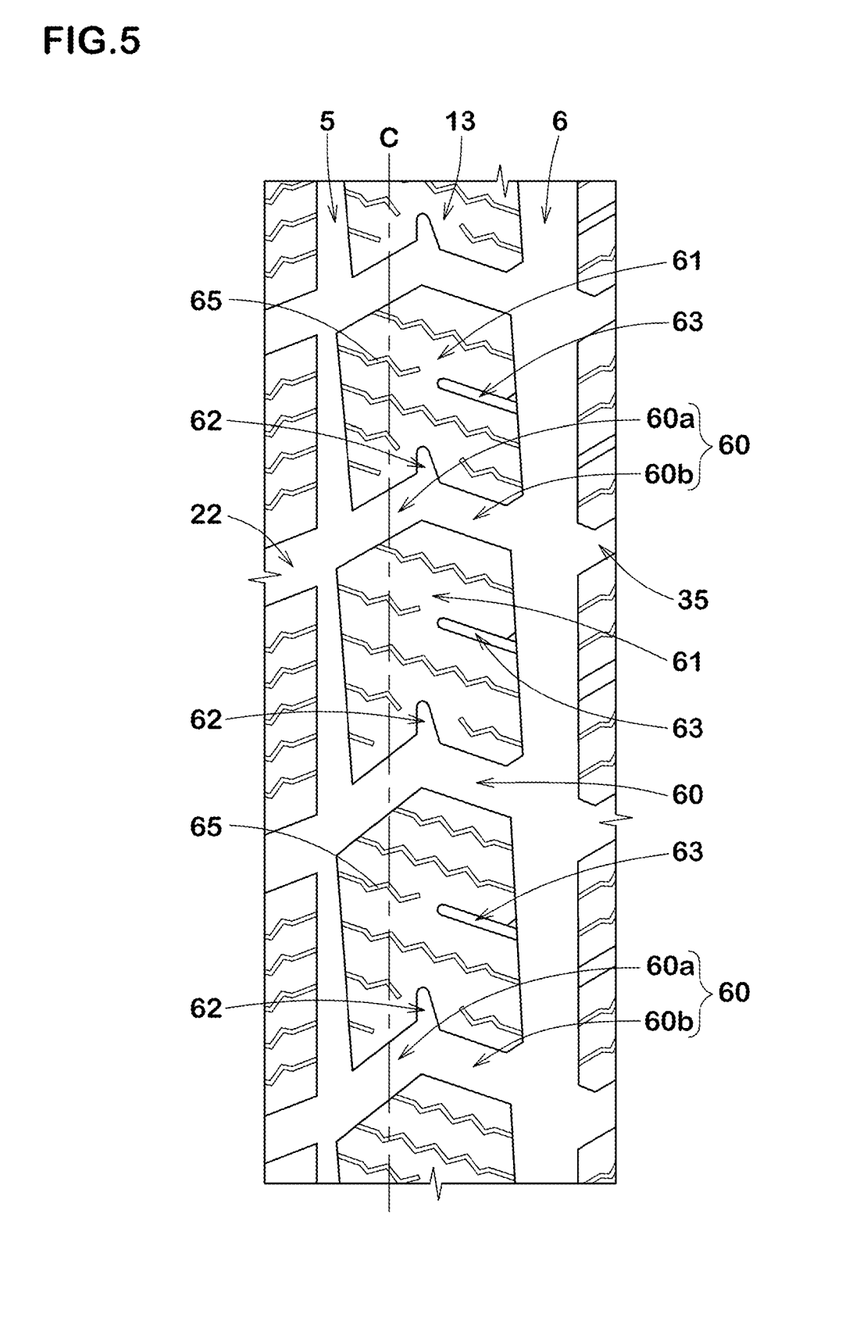
FIG. 5 is a partial view of the tread portion showing the crown land region.

FIG. 5 shows the crown land region 13. As shown, the crown land region 13 is provided with crown lateral grooves 60, and thereby circumferentially divided into a plurality of crown blocks 61.

The crown lateral grooves 60 extend across the entire axial width of the crown land region 13.

The crown lateral groove 60 in this example comprises a first crown groove portion 60a and a second crown groove portion 60b.

The first crown groove portion 60a extends from the outboard crown circumferential groove 5 while inclining with respect to the tire axial direction to the above-said second direction (to the other side in the tire circumferential direction).

The second crown groove portion 60b extends from the inboard crown circumferential groove 6 while inclining with respect to the tire axial direction to the above-said second direction (to the other side in the tire circumferential direction).

Such crown lateral grooves 60 can strongly compact the snow therein, and can further improve on-snow performance.

It is preferable that an extension of the second groove portion 22 of each of the outboard middle lateral grooves 20, which is extended in parallel to the longitudinal direction thereof, overlaps with
the outboard open end of the first crown groove portion 60a of one of the crown lateral grooves 60.

It is preferable that the circumferential width (or circumferential extent) of the opening of the inboard open end of the second crown groove portion 60b of each of the crown lateral grooves 60 overlaps, in the tire circumferential direction, with the circumferential width (or circumferential extent) of the opening of the axially inner end of one of the inboard middle lateral grooves 35.

Each of the crown blocks 61 is provided with a semi-closed first crown groove 62 and a semi-closed second crown groove 63.

The semi-closed first crown groove 62 extends from the crown lateral groove 60 and is terminated within the crown block 61.

The semi-closed second crown groove 63 extends from the inboard crown circumferential groove 6 and is terminated within the crown block 61.

Such semi-closed first crown groove 62 and semi-closed second crown groove 63 appropriately relax the rigidity of the crown block 61, and can prevent the crown lateral groove 60 and the inboard crown circumferential groove 6 from being clogged with snow.

Each of the crown blocks 61 is provided with a plurality of crown sipes 65.

In this example, all the crown sipes 65 are inclined with respect to the tire axial direction to the above-said second direction (to the other side in the tire circumferential direction) while extending from the inboard crown circumferential groove 6 side to the outboard crown circumferential groove 5 side.

While detailed description has been made of a preferable embodiment of the present disclosure, the present disclosure can be embodied in various forms without being limited to the illustrated embodiment.

Comparison Tests

Based on the tread pattern shown in FIG. 1, pneumatic tires of size 195/65R15 (rim size 15×6.0JJ) were experimentally manufactured as test tires (working example tires Ex.1-Ex.13, a comparative example tire Com., and a reference tire).

The comparative example tire had a tread pattern same as FIG. 1, excepting that the outboard shoulder lateral grooves and the inboard shoulder lateral grooves had the same bent angle.

Figure 6:
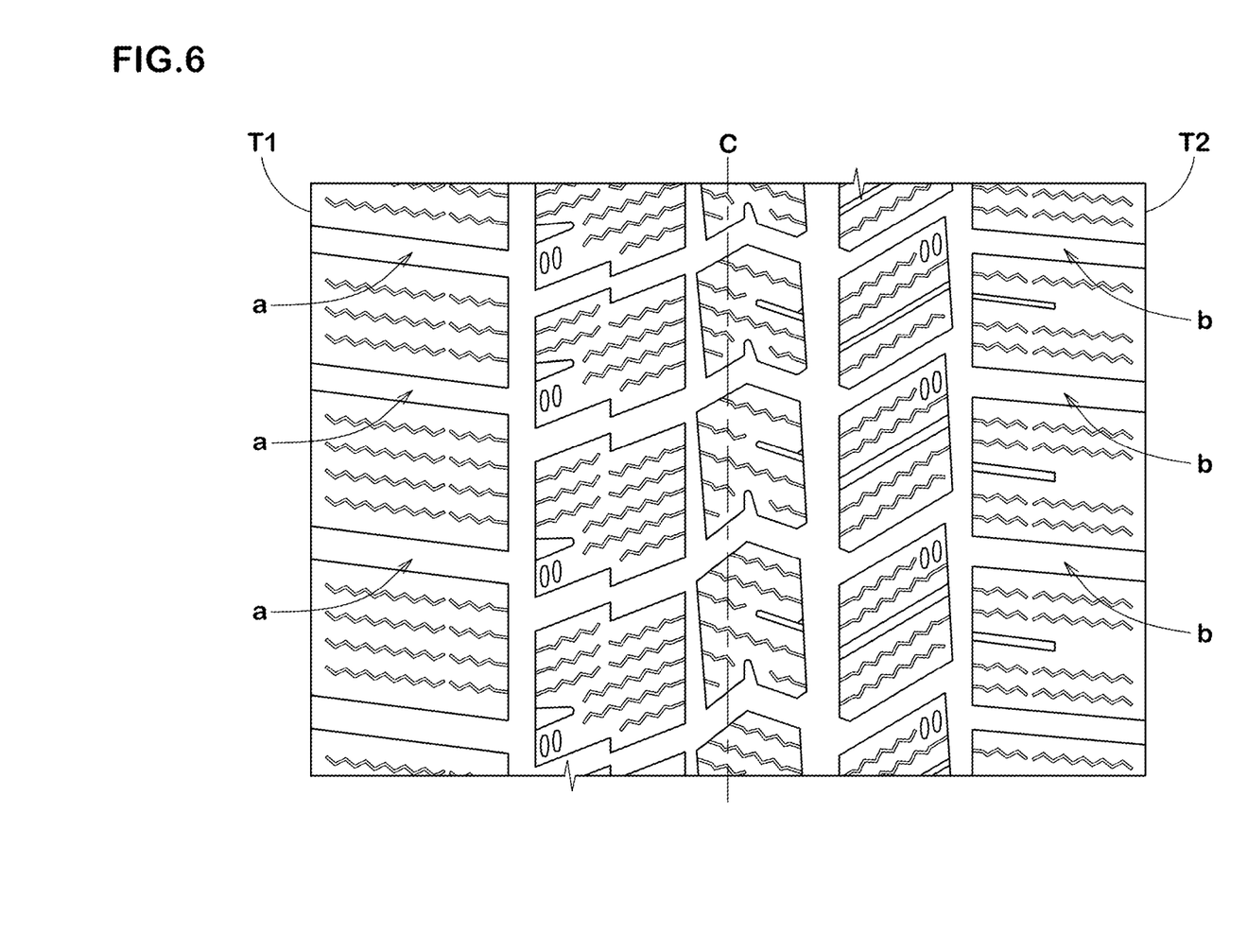
FIG. 6 is a developed partial view of a tread portion of a reference tire used in the undermentioned comparison tests.

The reference tire had a tread pattern same as FIG. 1, excepting that, as shown in FIG. 6, outboard shoulder lateral grooves (a) and inboard shoulder lateral grooves (b) were not bent.

Specifications of the test tires are shown in Table 1.

The test tires were tested for noise performance and on-snow cornering performance as follows, using a test car (1500 cc front-wheel-drive passenger car) with test tires mounted on all the four wheels and inflated to 200 kPa.

<Noise Performance Test>

When the test car was running on a dry road surface of a tire noise test course at a speed of 70 km/h, the maximum sound pressure level of the pass-by noise was measured to obtain the difference (noise reduction) from the maximum sound pressure level of the reference tire.
The results are indicated in Table 1 by an index based on the noise reduction of the comparative example Com. being 100, wherein the larger the index number, the smaller the maximum sound pressure level, namely, the better noise performance.
<On-Snow Cornering Performance Test>
When the test car was running on a snow covered road, the cornering performance was evaluated by the test driver.
The test results are indicated in Table 1 by an index based on the comparative example Com. being 100, wherein the larger the value, the better the on-snow cornering performance.

TABLE 1

| tire | Com. | Ex. 1 | Ex. 2 | Ex. 3 | Ex. 4 | Ex. 5 | Ex. 6 |
|---|---|---|---|---|---|---|---|
| outboard shoulder lateral groove bent angle θ1b (deg.) | 154 | 161 | 150 | 155 | 158 | 165 | 170 |
| inboard shoulder lateral groove bent angle θ2b (deg.) | 154 | 147 | 147 | 147 | 147 | 147 | 147 |
| θ1b/θ2b (%) | 100 | 110 | 102 | 105 | 107 | 112 | 116 |
| angle difference θ1b − θ2b (deg.) | 0 | 14 | 3 | 8 | 11 | 18 | 23 |
| noise performance | 100 | 122 | 115 | 118 | 120 | 122 | 125 |
| on-snow cornering performance | 100 | 108 | 106 | 107 | 108 | 107 | 105 |

| tire | Ex. 7 | Ex. 8 | Ex. 9 | Ex. 10 | Ex. 11 | Ex. 12 | Ex. 13 |
|---|---|---|---|---|---|---|---|
| outboard shoulder lateral groove bent angle θ1b (deg.) | 175 | 161 | 161 | 161 | 161 | 161 | 161 |
| inboard shoulder lateral groove bent angle θ2b (deg.) | 147 | 138 | 141 | 144 | 150 | 153 | 156 |
| θ1b/θ2b(%) | 119 | 117 | 114 | 112 | 107 | 105 | 103 |
| angle difference θ1b − θ2b (deg.) | 28 | 23 | 20 | 17 | 11 | 8 | 5 |
| noise performance | 128 | 126 | 123 | 121 | 117 | 114 | 112 |
| on-snow cornering performance | 104 | 105 | 106 | 107 | 107 | 106 | 106 |

As shown in Table 1, it was confirmed that the tires according to the present disclosure exhibited excellent noise performance and on-snow cornering performance.

Statement of the Present Disclosure

The Present Disclosure is as follows:

Disclosure 1: A tire having a mounting direction on a vehicle specified for the tire, comprising:
 a tread portion having an outboard tread edge to be positioned away from a center of a vehicle body when the tire is mounted on the vehicle, and an inboard tread edge to be positioned close to the center of the vehicle body,
 the tread portion provided, between the outboard tread edge and the inboard tread edge, with
  a plurality of circumferential grooves extending continuously in the tire circumferential direction, and
  a plurality of land regions divided by said plurality of circumferential grooves,
 wherein
  said plurality of circumferential grooves includes
   an outboard shoulder circumferential groove positioned on the most outboard tread edge side, and
   an inboard shoulder circumferential groove positioned on the most inboard tread edge side,
  said plurality of land regions includes
   an outboard shoulder land region positioned axially outside the outboard shoulder circumferential groove and including the outboard tread edge, and
   an inboard shoulder land region positioned axially outside the inboard shoulder circumferential groove and including the inboard tread edge,
  the outboard shoulder land region is provided with
   a plurality of outboard shoulder lateral grooves extending from the outboard shoulder circumferential groove to the outboard tread edge,
  the inboard shoulder land region is provided with
   a plurality of inboard shoulder lateral grooves extending from the inboard shoulder circumferential groove to the inboard tread edge,
  each of the outboard shoulder lateral grooves comprises
   an axially inner groove portion and an axially outer groove portion which are inclined with respect to the tire axial direction to opposite directions to each other and bent convexly toward one side in the tire circumferential direction,
  each of the inboard shoulder lateral grooves comprises
   an axially inner groove portion and an axially outer groove portion which are inclined with respect to the tire axial direction to opposite directions to each other and bent convexly toward the other side in the tire circumferential direction, and
  a first bent angle between the axially inner groove portion and the axially outer groove portion of each of the outboard shoulder lateral grooves is larger than
  a second bent angle between the axially inner groove portion and the axially outer groove portion of each of the inboard shoulder lateral grooves.

Disclosure 2: The tire according to Disclosure 1, wherein said first bent angle and said second bent angle are not less than 135 degrees and not more than 170 degrees.

Disclosure 3: The tire according to Disclosure 1 or 2, wherein
 a difference between said first bent angle and said second bent angle is not less than 8 degrees and not more than 18 degrees.

Disclosure 4: The tire according to Disclosure 1, 2 or 3, wherein
 the axially inner ends of the inboard shoulder lateral grooves are shifted in the tire circumferential direction from the axially inner ends of the outboard shoulder lateral grooves.

Disclosure 5: The tire according to any one of Disclosures 1 to 4, wherein
 each of the outboard shoulder lateral grooves includes a bent point between the axially inner groove portion and the axially outer groove portion thereof, and the bent point is located axially inside the center position in the tire axial direction of the ground contact surface of the outboard shoulder land region, and each of the inboard shoulder lateral grooves includes a bent point between the axially inner groove portion and the axially outer groove portion thereof, and the bent point is located axially inside the center position in the tire axial direction of the ground contact surface of the inboard shoulder land region.

Disclosure 6: The tire according to any one of Disclosures 1 to 5, wherein said plurality of land regions includes an outboard middle land region adjacent to the outboard shoulder land region with the outboard shoulder circumferential groove interposed therebetween, the outboard middle land region is provided with a plurality of semi-closed grooves extending from the outboard shoulder circumferential groove and terminated within the outboard middle land region, and the axially outer ends of the semi-closed grooves face the axially inner ends of the outboard shoulder lateral grooves through the outboard shoulder circumferential groove.

Disclosure 7: The tire according to any one of Disclosures 1 to 6, wherein said plurality of land regions includes an inboard middle land region adjacent to the inboard shoulder land region with the inboard shoulder circumferential groove interposed therebetween, the inboard middle land region is provided with a plurality of narrow lateral grooves extending across the entire axial width of the inboard middle land region, and the axially outer ends of the narrow lateral grooves face the axially inner ends of the inboard shoulder lateral grooves through the inboard shoulder circumferential groove.

Disclosure 8: The tire according to any one of Disclosures 1 to 7, wherein the axial width of the ground contact surface of the inboard shoulder land region is in a range from 80% to 90% of the axial width of the ground contact surface of the outboard shoulder land region.

Disclosure 9: The tire according to any one of Disclosures 1 to 8, wherein the axial length of said axially outer groove portion of each of the outboard shoulder lateral grooves is in a range from 65% to 75% of the axial width of the ground contact surface of the outboard shoulder land region.

Disclosure 10: The tire according to any one of Disclosures 1 to 9, wherein the axial length of said axially outer groove portion of each of the inboard shoulder lateral grooves is in a range from 60% to 75% of the axial width of the ground contact surface of the inboard shoulder land region.

Disclosure 11: The tire according to any one of Disclosures 1 to 10, wherein the inboard shoulder land region is provided with a plurality of semi-closed inboard shoulder grooves extending from the inboard shoulder circumferential groove and terminated without reaching the inboard tread edge, the outboard shoulder land region comprises a plurality of outboard shoulder blocks divided by a plurality of outboard shoulder lateral grooves, and each of the outboard shoulder blocks is provided with a plurality of sipes but not provided with a groove.

DESCRIPTION OF THE REFERENCE SIGNS 2 tread portion
3 circumferential groove
4 outboard shoulder circumferential groove
5 outboard crown circumferential groove
6 inboard crown circumferential groove
7 inboard shoulder circumferential groove
10 land region
11 outboard shoulder land region
12 outboard middle land region
13 crown land region
14 inboard middle land region
15 inboard shoulder land region
20 outboard middle lateral groove
35 inboard middle lateral groove
50 outboard shoulder lateral groove
50*i* axially inner groove portion
50*o* axially outer groove portion
51 outboard shoulder block
55 inboard shoulder lateral groove
55*i* axially inner groove portion
55*o* axially outer groove portion
57 inboard shoulder block
60 crown lateral groove
T1 outboard tread edge
T2 inboard tread edge

The invention claimed is:

1. A tire having a mounting direction on a vehicle specified for the tire, comprising:

a tread portion having an outboard tread edge to be positioned away from a center of a vehicle body when the tire is mounted on the vehicle, and an inboard tread edge to be positioned close to the center of the vehicle body, the tread portion provided, between the outboard tread edge and the inboard tread edge, with a plurality of circumferential grooves extending continuously in the tire circumferential direction, and a plurality of land regions divided by said plurality of circumferential grooves, wherein said plurality of circumferential grooves includes
an outboard shoulder circumferential groove positioned on the most outboard tread edge side, and
an inboard shoulder circumferential groove positioned on the most inboard tread edge side, said plurality of land regions includes
an outboard shoulder land region positioned axially outside the outboard shoulder circumferential groove and including the outboard tread edge, and
an inboard shoulder land region positioned axially outside the inboard shoulder circumferential groove and including the inboard tread edge, the outboard shoulder land region is provided with a plurality of outboard shoulder lateral grooves extending from the outboard shoulder circumferential groove to the outboard tread edge, the inboard shoulder land region is provided with a plurality of inboard shoulder lateral grooves extending from the inboard shoulder circumferential groove to the inboard tread edge, each of the outboard shoulder lateral grooves comprises an axially inner groove portion and an axially outer groove portion which are inclined with respect to the tire axial direction to opposite directions to each other and bent convexly toward one side in the tire circumferential direction, each of the inboard shoulder lateral grooves comprises an axially inner groove portion and an axially outer groove portion which are inclined with respect to the tire axial direction to opposite directions to each other and bent convexly toward the other side in the tire circumferential direction, a first bent angle between the axially inner groove portion and the axially outer groove portion of each of the outboard shoulder lateral grooves is larger than a second bent angle between the axially inner groove portion and the axially outer groove portion of each of the inboard shoulder lateral grooves, the inboard shoulder land region is provided with a plurality of semi-closed inboard shoulder grooves (56) that extend from the inboard shoulder circumferential groove, terminate without reaching the inboard tread edge, and are bent grooves extending in parallel with the inboard shoulder lateral grooves (55), the outboard shoulder land region is circumferentially divided by the outboard shoulder lateral grooves (50) into a plurality of outboard shoulder blocks, each of the outboard shoulder blocks is provided with a plurality of sipes but not provided with a groove, said plurality of land regions includes an inboard middle land region (14) adjacent to the inboard shoulder land region with the inboard shoulder circumferential groove interposed therebetween, the inboard middle land region (14) is provided with a plurality of inboard middle lateral grooves (35) that are straight grooves extending across the entire axial width of the inboard middle land region (14) to circumferentially divided the inboard middle land region (14) into a plurality of inboard middle blocks (36), and a plurality of narrow lateral grooves (38) that are straight grooves parallel with the inboard middle lateral grooves (35) and extend across the entire axial width of the inboard middle land region (14), the axially outer ends of the narrow lateral grooves (38) face the axially inner ends of the inboard shoulder lateral grooves (55) through the inboard shoulder circumferential groove, said plurality of circumferential grooves includes an outboard crown circumferential groove (5) and an inboard crown circumferential groove (6) positioned between the outboard shoulder circumferential groove and the inboard shoulder circumferential groove, said plurality of the land regions further include a crown land region (13) defined between the outboard crown circumferential groove (5) and the inboard crown circumferential groove (6), the crown land region (13) is circumferentially divided by a plurality of crown lateral grooves (60) into a plurality of crown blocks (61), and each of the crown lateral grooves (60) is a bent groove made up of a first crown groove portion (60*a*) and a second crown groove portion (60*b*).

2. The tire according to claim 1, wherein each of the outboard shoulder lateral grooves includes a bent point between the axially inner groove portion and the axially outer groove portion thereof, and the bent point is located axially inside the center position in the tire axial direction of the ground contact surface of the outboard shoulder land region, and each of the inboard shoulder lateral grooves includes a bent point between the axially inner groove portion and the axially outer groove portion thereof, and the bent point is located axially inside the center position in the tire axial direction of the ground contact surface of the inboard shoulder land region.

3. The tire according to claim 1, wherein said plurality of land regions includes an outboard middle land region adjacent to the outboard shoulder land region with the outboard shoulder circumferential groove interposed therebetween, the outboard middle land region is provided with a plurality of semi-closed grooves extending from the outboard shoulder circumferential groove and terminated within the outboard middle land region, and the axially outer ends of the semi-closed grooves face the axially inner ends of the outboard shoulder lateral grooves through the outboard shoulder circumferential groove.

4. The tire according to claim 1, wherein the axial width of the ground contact surface of the inboard shoulder land region is in a range from 80% to 90% of the axial width of the ground contact surface of the outboard shoulder land region.

5. The tire according to claim 1, wherein the axial length of said axially outer groove portion of each of the outboard shoulder lateral grooves is in a range from 65% to 75% of the axial width of the ground contact surface of the outboard shoulder land region.

6. The tire according to claim 1, wherein the axial length of said axially outer groove portion of each of the inboard shoulder lateral grooves is in a range from 60% to 75% of the axial width of the ground contact surface of the inboard shoulder land region.

7. The tire according to claim 1, wherein the axial width of the ground contact surface of the inboard shoulder land region is in a range from 80% to 90% of the axial width of the ground contact surface of the outboard shoulder land region, the axial length of said axially outer groove portion of each of the outboard shoulder lateral grooves is in a range from 65% to 75% of the axial width of the ground contact surface of the outboard shoulder land region, and the axial length of said axially outer groove portion of each of the inboard shoulder lateral grooves is in a range from 60% to 75% of the axial width of the ground contact surface of the inboard shoulder land region.

8. The tire according to claim 1, which comprises the tread portion, a pair of sidewall portions and a pair of bead portions, wherein one of the sidewall portions to be located on outside when attached to the vehicle is provided with an indication that means "outside", and the other of the tire sidewall portion to be located on inside is provided with an indication that means "inside".

9. The tire according to claim 1, wherein the axially inner ends of the inboard shoulder lateral grooves are shifted in the tire circumferential direction from the axially inner ends of the outboard shoulder lateral grooves.

10. The tire according to claim 9, wherein each of the outboard shoulder lateral grooves includes a bent point between the axially inner groove portion and the axially outer groove portion thereof, and the bent point is located axially inside the center position in the tire axial direction of the ground contact surface of the outboard shoulder land region, and each of the inboard shoulder lateral grooves includes a bent point between the axially inner groove portion and the axially outer groove portion thereof, and the bent point is located axially inside the center position in the tire axial direction of the ground contact surface of the inboard shoulder land region.

11. The tire according to claim 1, wherein a difference between said first bent angle and said second bent angle is not less than 8 degrees and not more than 18 degrees.

12. The tire according to claim 11, wherein the axially inner ends of the inboard shoulder lateral grooves are shifted in the tire circumferential direction from the axially inner ends of the outboard shoulder lateral grooves.

13. The tire according to claim 11, wherein
each of the outboard shoulder lateral grooves includes a bent point between the axially inner groove portion and the axially outer groove portion thereof, and the bent point is located axially inside the center position in the tire axial direction of the ground contact surface of the outboard shoulder land region, and
each of the inboard shoulder lateral grooves includes a bent point between the axially inner groove portion and the axially outer groove portion thereof, and the bent point is located axially inside the center position in the tire axial direction of the ground contact surface of the inboard shoulder land region.

14. The tire according to claim 1, wherein said first bent angle and said second bent angle are not less than 135 degrees and not more than 170 degrees.

15. The tire according to claim 14, wherein
each of the outboard shoulder lateral grooves includes a bent point between the axially inner groove portion and the axially outer groove portion thereof, and the bent point is located axially inside the center position in the tire axial direction of the ground contact surface of the outboard shoulder land region, and
each of the inboard shoulder lateral grooves includes a bent point between the axially inner groove portion and the axially outer groove portion thereof, and the bent point is located axially inside the center position in the tire axial direction of the ground contact surface of the inboard shoulder land region.

16. The tire according to claim 14, wherein the axially inner ends of the inboard shoulder lateral grooves are shifted in the tire circumferential direction from the axially inner ends of the outboard shoulder lateral grooves.

17. The tire according to claim 16, wherein
each of the outboard shoulder lateral grooves includes a bent point between the axially inner groove portion and the axially outer groove portion thereof, and the bent point is located axially inside the center position in the tire axial direction of the ground contact surface of the outboard shoulder land region, and
each of the inboard shoulder lateral grooves includes a bent point between the axially inner groove portion and the axially outer groove portion thereof, and the bent point is located axially inside the center position in the tire axial direction of the ground contact surface of the inboard shoulder land region.

18. The tire according to claim 14, wherein a difference between said first bent angle and said second bent angle is not less than 8 degrees and not more than 18 degrees.

19. The tire according to claim 18, wherein the axially inner ends of the inboard shoulder lateral grooves are shifted in the tire circumferential direction from the axially inner ends of the outboard shoulder lateral grooves.

20. The tire according to claim 18, wherein
each of the outboard shoulder lateral grooves includes a bent point between the axially inner groove portion and the axially outer groove portion thereof, and the bent point is located axially inside the center position in the tire axial direction of the ground contact surface of the outboard shoulder land region, and
each of the inboard shoulder lateral grooves includes a bent point between the axially inner groove portion and the axially outer groove portion thereof, and the bent point is located axially inside the center position in the tire axial direction of the ground contact surface of the inboard shoulder land region.

\* \* \* \* \*